US008837839B1

(12) United States Patent
Huber et al.

(10) Patent No.: US 8,837,839 B1
(45) Date of Patent: Sep. 16, 2014

(54) METHOD FOR RECOGNITION AND POSE ESTIMATION OF MULTIPLE OCCURRENCES OF MULTIPLE OBJECTS IN VISUAL IMAGES

(75) Inventors: David J. Huber, Calabasas, CA (US); Deepak Khosla, Camarillo, CA (US)

(73) Assignee: HRL Laboratories, LLC, Malibu, CA (US)

( * ) Notice: Subject to any disclaimer, the term of this patent is extended or adjusted under 35 U.S.C. 154(b) by 212 days.

(21) Appl. No.: 12/938,722

(22) Filed: Nov. 3, 2010

(51) Int. Cl.
*G06K 9/62* (2006.01)
*G06K 9/36* (2006.01)
*G06K 9/64* (2006.01)
*G06K 9/32* (2006.01)

(52) U.S. Cl.
USPC ........... 382/224; 382/154; 382/284; 382/285; 382/278; 382/299

(58) Field of Classification Search
USPC .................................. 382/224, 284–285, 154
See application file for complete search history.

(56) References Cited

U.S. PATENT DOCUMENTS

| | | | |
|---|---|---|---|
| 2008/0013836 A1* | 1/2008 | Nakamura et al. | 382/209 |
| 2008/0075361 A1* | 3/2008 | Winn et al. | 382/155 |
| 2009/0103814 A1* | 4/2009 | Nakamura et al. | 382/201 |
| 2009/0279792 A1* | 11/2009 | Obdrzalek et al. | 382/224 |
| 2011/0052043 A1* | 3/2011 | Hyung et al. | 382/154 |

OTHER PUBLICATIONS

Wang et al. Robust Adaptive-Scale Parametric Model Estimation for Computer Vision. IEEE, vol. 26, No. 11, 2004, pp. 1459-1474.*
Lowe "Local Feature View Clustering for 3D Object Recognition" IEEE, 2001, pp. 682-688.*
Se "Vision-based Mobile Robot Localization and Mapping using Scale-Invariant Features", IEEE, 2001, pp. 2051-2058.*
He et al. "Planar surface detection in image pairs using homographic constraints", Advance in Visual computing, Second Internation Symposium, ISVC 2006, vol. 1, Nov. 2006, pp. 19-27.*
Zuliani et al. "The multiRANSAC algorithm and its application to detect planar homographies", IEEE, 2005, p. 1-4.*
Lowe, D. (2004) Distinctive Image Features from Scale-Invariant Keypoints. Int. J. of Computer Vision. 60(2): 91-110.
Lowe, D. (1999) Object Recognition from Local Scale-Invariant Features. Intl Conf on Computer Vision, Corfu, Greece. 1150-1157.
Zickler, S. and Veloso, M. (2006) Detection and Localization of Multiple Objects. Proc of Humanoids, 2006.

(Continued)

*Primary Examiner* — Matthew Bella
*Assistant Examiner* — Weiwen Yang
(74) *Attorney, Agent, or Firm* — Tope-McKay & Associates

(57) ABSTRACT

Described is a system for multiple-object recognition in visual images. The system is configured to receive an input test image comprising at least one object. Keypoints representing the object are extracted using a local feature algorithm. The keypoints from the input test image are matched with keypoints from at least one training image stored in a training database, resulting in a set of matching keypoints. A clustering algorithm is applied to the set of matching keypoints to detect inliers among the set of matching keypoints. The inliers and neighboring keypoints in a vicinity of the inliers are removed from the input test image. An object label and an object boundary for the object are generated, and the object in the input test image is identified and segmented. Also described is a method and computer program product for multiple-object recognition in visual images.

18 Claims, 11 Drawing Sheets

(56) References Cited

OTHER PUBLICATIONS

Murphy-Chutorian, E.; Aboutalib, S.; and Triesch, J. (2005). Analysis of a Biologically-Inspired System for Real-Time Object Recognition. Cognitive Science Online, v3.2: 1-14.

Moss, S. and Hancock E.R. (1999) Pose Clustering with Density Estimation and Structural Constraints. Proc 1999 IEEE Comp Soc Conf on Computer Vision and Pattern Recognition (CVPR 1999) 2:2085.

Chen, H. and Meer, P. (2002) Robust Computer Vision through Kernel Density Estimation. Proc 7th Euro Conf on Comp Vision: 1:236-250.

Pelleg, D. and Moore, A. (2000). X-means: Extending K-means with Efficient Estimation of the Number of Clusters. Proc 17th Annual Conf on Machine Learning. 727-734.

Hajdu, A., Pitas, I., Optimal Approach for Fast Object-Template Matching, IEEE Transactions on Image processing, No. 8, Aug. 2007:2048-2057.

Bay, H.; Tuytelaars, T.; and Van Gool, L. (2006). SURF: Speeded Up Robust Features. Proc 9th Euro Conf on Comp Vision.

Carniero, G. and Jepson A.D. (2007) Flexible Spatial Configuration of Local Image Features. IEEE Transactions on Pattern Analysis and Machine Intelligence 29(12):2089-2104.

Jimenez, D.G. (2007) Evaluation of Point Localization and Similarity Fusion Methods for Gabor Jets-Based Face Verification. Accepted in IET Computer Vision.

Abdel-Hakim, A. and Farag, A. (2006). CSIFT: A SIFT Descriptor with Color Invariant Characteristics. Proc 2006 IEEE Comp Soc Conf on Computer Vision and Pattern Recognition (CVPR 2006).

C. Cortes and V. Vapnik (1995) Support-vector networks. Machine Learning. 20:273-297.

Fischler, M.A. and Bolles, R.C. (1981). Random Sample Consensus: A Paradigm for Model Fitting with Applications to Image Analysis and Automated Cartography. Comm of the ACM. 24: 381-395.

Ballard, D.H. (1981). Generalizing the Hough Transform to Detect Arbitrary Shapes. Pattern Recognition. 13(2): 111-122.

Silverman, B.W. (1992). Density Estimation for Statistics and Data Analysis. Chapman and Hall/CRC: Boca Raton, FL. 76-87.

Fukunaga, K. (1972) Introduction to Statistical Pattern Recognition. Academic Press, New York, pp. 28-30.

Nene, S.A.; Nayar, S.K.; and Murase, H. (1996). Columbia Object Image Library (COIL-100). Technical Report CUCS-006-96. Feb. 1996.

* cited by examiner

METHOD FOR RECOGNITION AND POSE ESTIMATION OF MULTIPLE OCCURRENCES OF MULTIPLE OBJECTS IN VISUAL IMAGES

BACKGROUND OF THE INVENTION (1) Field of Invention

The present invention relates to a system for multiple-object recognition in visual images and, more particularly, to a system for multiple-object recognition using keypoints generated from local feature algorithms in visual images.

(2) Description of Related Art

Accurate and robust recognition of objects in a cluttered natural scene remains one of the most difficult problems faced by the computer vision field. The primary issue is that the same object appears differently to a viewer depending on the viewing angle (azimuth and elevation), the distance of the viewer (which affects the perceived size of the object, that is its scale), and whether it is partially occluded by other objects (and the degree of this occlusion). Human perception solves these problems with a minimum of effort. Based on a limited number of training views, a human being can learn enough about an object to accurately recognize it in each of these scenarios. The computerized recognition problem also shares the problem of maintaining a reasonably sized database that acts as memory of trained objects. One must represent the training object in a minimalist way to provide adequate speed, but must also capture enough information to retain recognition accuracy.

A number of researchers have attempted the problem of recognition of multiple objects in a scene with varying degrees of success. The most robust algorithms tend to rely on local feature extraction, which employ a set of keypoints located at stable regions in the image to identify objects. Each keypoint is assigned the label of its nearest match from a training database, and the combination of these matches is used to identify the object. This method provides a great deal more robustness than alternative algorithms such as template matching as described by Hajdu and Pitas (see Literature Reference No. 8), which simply looks for exact copies of objects from the training set and cannot account for planar rotations and scaling of training objects. Because they use local features to perform object recognition, these algorithms are collectively known as "local feature algorithms" (LFAs). Non-limiting examples of LFAs include Speeded Up Robust Features (SURF) as described by Bay et at (see Literature Reference No. 9), SIFT as described by Lowe (see Literature Reference No. 1), jets-(Gabor) based Features as described by Jimenez (see Literature Reference No. 1), and the "semilocal" features of Carniero and Jepson (see Literature Reference No. 10), as well as a number of color variants of these algorithms as described by Abdel-Hakim and Farag (see Literature Reference No. 12). However, although LFAs can extract keypoints, how to process these keypoints remains an open problem.

Despite their similar results, the problem of recognizing and segmenting multiple objects in a scene is a far more complex problem than the simple recognition of a single object, when the computer knows "a priori" that there is only one object in the frame. In this instance, one could simply give each keypoint a vote and identify the object according to the most votes. This method provides very accurate identification of objects. For a scene known to contain multiple objects, the recognition algorithm must localize clusters of keypoints belonging to a single object, compensate for outlier noise caused by misclassification of keypoints, and process keypoint clusters to find the optimal object boundary and pose based on the training data.

Multiple-object recognition and segmentation is the ability to correctly identify objects in a scene and identify multiple occurrences of the same object in the scene. While algorithms exist that can perform multiple-object segmentation, they cannot accommodate scenes in which the same object appears twice in different poses. These algorithms typically miss the second occurrence of the same object or recognize the same object multiple times. The closest prior art of using local feature algorithms (LFAs) to perform recognition of multiple objects in a scene was described by Lowe (see Literature Reference Nos. 1 and 2), who employed the scale-invariant feature transform (SIFT) algorithm to extract keypoints from a natural scene and perform boundary segmentation and object recognition based on a population of inlier keypoints provided by the Generalized Hough transform and least-squares fitting. The work by Lowe provided an affine transform matrix that could be applied to the outline of a training image to provide a rough estimate of the object boundary. However, this work did not employ multiple views for each training object. Rather, keypoints were extracted for a single view for each of three training objects, and the test objects were not manipulated dramatically from their training pose. Lowe did, however, show that his algorithm is robust against partial occlusion of an object by another. He also showed an extremely limited application for multiple instances of the same object; however, this was carried out by simple clustering and would not extend to images where the identical objects are close to one another, or with objects that are likely to create many misclassified keypoints. In these cases, simple clustering algorithms would fail to separate the keypoint populations provided by separate identical objects.

Work by Zickler and Veloso (see Literature Reference No. 3) successfully finds multiple instances of the same object using clustering algorithms on sets of keypoints extracted using Principal Components Analysis (PCA) based representation for local features (PCA-SIFT). Their work demonstrates a great deal of success at labeling the centers of multiple objects in a scene. However, this algorithm does not extract any information about the pose of an object and cannot provide an object boundary. Additionally, this clustering algorithm exhibits a significant false positive rate at recognition rates greater than ninety percent. Similarly, the work of Murphy-Chutorian et al. (see Literature Reference No. 4) also successfully labels the centroids of multiple objects in a scene using a biologically-inspired recognition algorithm that shows a much lower false positive rate than Zickler and Veloso on a much larger training database. However, the biologically-inspired recognition algorithm also does not provide an object boundary or pose information and simply places a label at the center of the object.

Additionally, prior art exists that uses kernel density estimation to perform object recognition. For example, work by Moss and Hancock (see Literature Reference No. 5) and Chen and Meer (see Literature Reference No. 6) describes the use of kernel density estimation for computer vision, but not specifically for object recognition and does not use feature keypoints. The work by Moss and Hancock performs object alignment, while the work by Chen and Meer is used to recover structures from heavily corrupted data.

Each of the prior methods discussed above exhibit limitations that make them incomplete. This is due to various problems with their theoretical structure that limit their effectiveness in practice, especially with regard to recognition of multiple instances of the same object in a scene. For example, the method proposed by Lowe (see Literature Reference No. 2) to recognize and segment multiple objects assumes that a single instance of each object occurs in each scene, and does not contain a mechanism to remove keypoints belonging to a segmented object (e.g., a scene with two bottles; prior art will only recognize one of them). The multiple-object recognition schemes of Murphy-Chutorian et al. (see Literature Reference No. 4) and Zickler and Veloso (see Literature Reference No. 3) can recognize multiple instances of the same object, but only place an object label at the centroid of the keypoints; they do not perform segmentation or extract pose information from the object, which limits its practical application in industry. In general, each of the prior art considers a specific facet of the multiple object recognition problem, but none of them solve the essential problem of multiple-object recognition and segmentation.

The problem could potentially be remedied by clustering algorithms; however, the most prominent algorithms such as k-means clustering require the number of clusters required to be known beforehand. Since one does not know the specific number of each object in the scene prior to identification, this method will not work. More robust methods of clustering that do not require a predetermined number of clusters exist, such as the X-means algorithm described by Pelleg and Moore (see Literature Reference No. 7), but they work slower than needed for efficient object recognition.

Thus, a continuing need exists for a system that correctly identifies objects in a visual scene, provides boundary and pose information for each object, and can identify multiple occurrences of the same object in the scene in an efficient manner.

SUMMARY OF THE INVENTION

The present invention relates to a system for multiple-object recognition in visual images. The system comprises one or more processors configured to perform operations of first receiving an input test image comprising at least one object. A plurality of keypoints representing the at least one object is extracted from the input test image using a local feature algorithm. The plurality of keypoints from the input test image are then matched with a plurality of keypoints from at least one training image having a boundary mask stored in a training database, resulting in a set of matching keypoints. A clustering algorithm is applied to the set of matching keypoints to detect a plurality of inliers among the set of matching keypoints. The plurality of inliers and a plurality of neighboring keypoints in a vicinity of the plurality of inliers are removed from the input test image. An object label and an object boundary for the at least one object are generated. Finally, the at least one object in the input test image is identified and segmented.

In another aspect, the system is further configured to perform an operation of classifying each of the plurality of keypoints from the input test image with an object label and a pose according to a nearest match in the training database using a classifier algorithm.

In another aspect, the system is further configured to perform an operation of constructing a histogram to sort the set of matching keypoints according to their object labels.

In another aspect, the system is further configured to perform operations of computing an affine transform matrix using a least squares estimator between the inliers and a set of corresponding keypoints in the at least one training image; and applying the affine transform matrix to the boundary mask of the at least one training image to provide the object boundary.

In another aspect, the system is further configured to perform operations of representing the at least one object in the input test image with a probability density function that describes the likelihood that a pixel in the input test image falls within an actual boundary of the at least one object; constructing a probability density function using kernel density estimation to determine a density estimate for each inlier; and removing the plurality of neighboring keypoints from the at least one object in the input test image using a density estimate determined from the plurality of inliers.

In another aspect, the system is further configured to perform operations of computing a probability that a keypoint belongs to the at least one identified object in the input test image; and removing a keypoint if the probability that the keypoint falls within the at least one identified object is above a predetermined threshold.

As can be appreciated by one in the art, the present invention also comprises a method for causing a processor to perform the operations described herein.

As can be appreciated by one in the art, the present invention also comprises a computer program product comprising computer-readable instruction means stored on a non-transitory computer-readable medium that are executable by a computer having a processor for causing the processor to perform the operations described herein.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
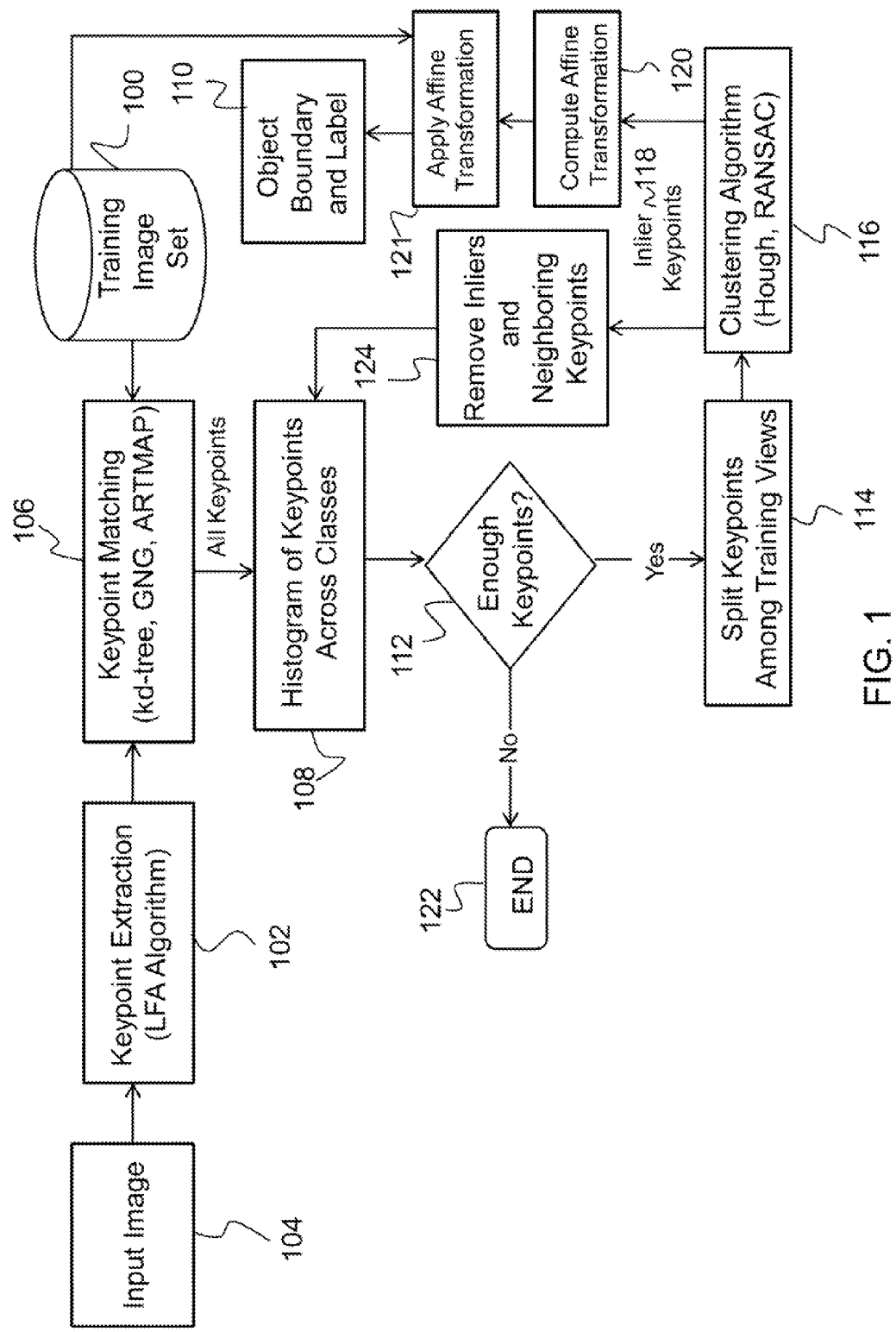
FIG. 1 is a flow diagram of a method for multiple-object recognition in visual images according to the present invention.

The present invention relates to a system for multiple-object recognition in visual images and, more particularly, to a system for multiple-object recognition using keypoints generated from local feature algorithms in visual images. The following description is presented to enable one of ordinary skill in the art to make and use the invention and to incorporate it in the context of particular applications. Various modifications, as well as a variety of uses, in different applications will be readily apparent to those skilled in the art, and the general principles defined herein may be applied to a wide range of embodiments. Thus, the present invention is not intended to be limited to the embodiments presented, but is to be accorded with the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter-clockwise have been used for convenience purposes only and are not intended to imply any particular fixed direction. Instead, they are used to reflect relative locations and/or directions between various portions of an object. As such, as the present invention is changed, the above labels may change their orientation.

(1) LIST OF CITED LITERATURE REFERENCES

The following references are cited throughout this application. For clarity and convenience, the references are listed herein as a central resource for the reader. The following references are hereby incorporated by reference as though fully included herein. The references are cited in the application by referring to the corresponding literature reference number.
1. Lowe, D. (2004) Distinctive Image Features from Scale-Invariant Keypoints. *Int. J. of Computer Vision.* 60(2): 91-110.
2. Lowe, D. (1999) Object Recognition from Local Scale-Invariant Features. *Intl Conf on Computer Vision*, Corfu, Greece. 1150-1157.
3. Zickler, S. and Veloso, M. (2006) Detection and Localization of Multiple Objects. *Proc of Humanoids*, 2006.
4. Murphy-Chutorian, E.; Aboutalib, S.; and Triesch, J. (2005). Analysis of a Biologically-Inspired System for Real-Time Object Recognition. *Cognitive Science Online*, v 3.2: 1-14.
5. Moss, S. and Hancock E. R. (1999) Pose Clustering with Density Estimation and Structural Constraints. Proc 1999 *IEEE Comp Soc Conf on Computer Vision and Pattern Recognition* (CVPR 1999) 2:2085.
6. Chen, H. and Meer, P. (2002) Robust Computer Vision through Kernel Density Estimation. *Proc $7^{th}$ Euro Conf on Comp Vision:* 1:236-250.
7. Pelleg, D. and Moore, A. (2000). X-means: Extending K-means with Efficient Estimation of the Number of Clusters. *Proc $17^{th}$ Annual Conf on Machine Learning.* 727-734.
8. Hajdu, A., Pitas, I., Optimal Approach for Fast Object-Template Matching, IEEE Transactions on Image processing, No. 8, August 2007: 2048-2057.
9. Bay, H.; Tuytelaars, T.; and Van Gool, L. (2006). SURF: Speeded Up Robust Features. *Proc $9^{th}$ Euro Conf on Comp Vision.*
10. Carniero, G. and Jepson A. D. (2007) Flexible Spatial Configuration of Local Image Features. IEEE Transactions on Pattern Analysis and Machine Intelligence 29(12): 2089-2104.
11. Jimenez, D. G. (2007) Evaluation of Point Localization and Similarity Fusion Methods for Gabor Jets-Based Face Verification. *Accepted in IET Computer Vision.*
12. Abdel-Hakim, A. and Farag, A. (2006). CSIFT: A SIFT Descriptor with Color Invariant Characteristics. *Proc 2006 IEEE Comp Soc Conf on Computer Vision and Pattern Recognition* (CVPR 2006).
13. C. Cortes and V. Vapnik (1995) Support-vector networks. *Machine Learning.* 20:273-297.
14. Fischler, M. A. and Bolles, R. C. (1981). Random Sample Consensus: A Paradigm for Model Fitting with Applications to Image Analysis and Automated Cartography. *Comm of the ACM.* 24: 381-395.
15. Ballard, D. H. (1981). Generalizing the Hough Transform to Detect Arbitrary Shapes. *Pattern Recognition.* 13(2): 111-122.
16. Silverman, B. W. (1992). *Density Estimation for Statistics and Data Analysis*. Chapman and Hall/CRC: Boca Raton, Fla. 76-87.
17. Fukunaga, K. (1972) *Introduction to Statistical Pattern Recognition*. Academic Press, New York.
18. Nene, S. A.; Nayar, S. K.; and Murase, H. (1996). Columbia Object Image Library (COIL-100). *Technical Report CUCS*-006-96. February 1996.

(2) PRINCIPAL ASPECTS

The present invention has three "principal" aspects. The first is a system for multiple-object recognition in visual images. The system is typically in the form of a computer system, computer component, or computer network operating software or in the form of a "hard-coded" instruction set. This system may take a variety of forms with a variety of hardware devices and may include computer networks, hand-held computing devices, cellular networks, satellite networks, and other communication devices. As can be appreciated by one skilled in the art, this system may be incorporated into a wide variety of devices that provide different functionalities. The second principal aspect is a method for multiple-object recognition in visual images, typically in the form of software, operated using a data processing system (computer or computer network). The third principal aspect is a computer program product. The computer program product generally represents computer-readable instruction means stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories.

The term "instruction means" as used with respect to this invention generally indicates a set of operations to be performed on a computer, and may represent pieces of a whole program or individual, separable, software modules. Non-limiting examples of "instruction means" include computer program code (source or object code) and "hard-coded" electronics (i.e. computer operations coded into a computer chip). The "instruction means" may be stored in the memory of a computer or on a non-transitory computer-readable medium such as a floppy disk, a CD-ROM, and a flash drive. These aspects will be described in more detail below.

(3) SPECIFIC DETAILS

The present invention describes a system for multiple-object recognition and segmentation using keypoints generated from local feature algorithms (LFAs) that correctly identifies objects in a natural scene, provides a boundary and information about the pose for each object, and can identify multiple occurrences of the same object (e.g., two identical objects, side-by-side) in the scene from different training views.

The present invention is useful for any application that requires the identification of multiple objects within a scene. For example, a factory assembly line or supply depot might have a set of identical parts. Therefore, it is useful to be able to recognize every instance of a given part, rather than just one. Furthermore, the present invention can be employed in threat assessment applications where a system must quickly classify what it sees as either friend or foe. In these environments, the system may have to identify multiple occurrences of the same object (e.g., people, cars, buildings) within the scene. These objects may be close enough to each other to confound traditional keypoint clustering mechanisms. Other non-limiting examples of potential applications include automotive safety, factory safety and efficiency, autonomous systems, robotics, and intelligence analysis.

The specific challenge to multiple object segmentation is one of keypoint association. Keypoints are interesting points on an object which provide a feature description of the object, and which can be extracted from an image. In general, recognition is performed using an object database, which consists of different views of the training object. However, these views are often very coarse, representing large differences in viewpoint (i.e., four views covering 360 degrees). Each view donates keypoints to the database, which are correlated with the keypoints found in a test object. In practice, the objects that the system views will consist of an interpolation of training images, and will therefore contain keypoints that correspond to two or more training views of the same object. While the identification, segmentation, and pose estimation process must choose one view as dominant, it is critical to remove the keypoints from the other training views after making identification. Otherwise, the recognition algorithm may find "false positive" instances of the already-identified object using keypoints from these other poses. The algorithm eliminates this risk by clearing out keypoints that correspond to different poses of the same object in the neighborhood of the inliers (i.e., the set of keypoints that provide the closest match to the training set and are used for pose estimation and segmentation), while preserving keypoints that fall far away from the inliers, which typically correspond to a second instance of the same object.

The present invention describes a detailed computational method to process the keypoints generated by an LFA that allows a computer to both provide labels for multiple objects in a scene and segmentation boundaries for the object based on the structure of its keypoints. In addition to preserving the ability to detect partially occluded objects, as demonstrated by Lowe (see Literature Reference Nos. 1 and 2), the method presented herein also permits the identification of multiple instances of the same object class in the same scene. This method is carried out efficiently by using keypoint statistics to produce a probability density estimate for the existence of an object that alleviates the need for multiple steps of keypoint classification and sorting into histograms that other multiple-object recognition algorithms suffer.

The present invention improves upon the prior art in that it employs the statistical information obtained from the distribution of keypoints provided by a LFA. The present invention also employs kernel density estimation techniques to construct a rough object boundary which is used to efficiently prune features and keypoints of a specific object from the scene without disturbing similar features from other objects elsewhere in the scene. The approach described herein allows one to analyze much more complicated scenes than previously possible, since many scenes that occur in nature contain multiple instances of the same object.

The purpose of this work is not to supplant the prior art provided by the LFA. Rather, the algorithm employs the position and distribution of the keypoints in a novel way to utilize previously ignored information provided by their spatial location and distribution across an object. The use of kernel density estimation techniques captures this previously disregarded knowledge and employs it to eliminate the classification errors that other object recognition and segmentation algorithms exhibit.

FIG. 1 is a flowchart of the method described in the present invention for multiple-object recognition and segmentation/localization, which processes a set of labeled LFA keypoints and returns labels and boundaries for each object in the scene. Because of their structure, the system, method, and computer program product described herein can recognize multiple instances of the same object class in the scene and are very robust to changes in the planar geometry of the object (including both in- and out-of-plane object rotations). The recognition is carried out using a probability model that erases the keypoints in the vicinity of the segmented object and alleviates the need for nested sorting steps.

Prior to any type of object recognition, a training database of at least one training image set 100 must be constructed that will allow the labeling of individual keypoints based on their nearest match to the training set. The training image set 100 should consist of multiple views of each object. The keypoints for each image are extracted using the appropriate LFA and added to a classifier of some sort that will allow fast matching of keypoint descriptors between the training set and the test image, where the object label and pose that generates each keypoint is stored in each classifier node. The specific classifier is unimportant to the application of the present invention; however, non-limiting examples of potential classifiers include kd-tree algorithms and support vector machines (SVM) as described by Cortes and Vapnik (see Literature Reference No. 13). Each training image should have a boundary mask, which can be extracted by an automated process or hand-drawn. The boundary mask provides a basis upon which an affine transform can be applied, and the object boundary determined.

As shown in FIG. 1, the first stage of the object recognition process involves extracting the keypoints (keypoint extraction 102) from a test input image 104 according to a LFA. The specific choice of LFA (e.g., SIFT) is not critical to this application. Nevertheless, non-limiting examples of LFAs include SIFT, SURF, jets-(Gabor) based features, and "semilocal" features. Each keypoint is classified with an object label and pose according to its nearest match to the training images set 100 in the training database, as well as all of the information about its closest match to the training image set 100 in the training database (keypoint matching 106). This classification information tells the computer not only which object the keypoint is most likely to belong to, but also the specific training image that the keypoint most resembles. This is critical for determining the correct training mask to use when constructing the object boundary.

Once each keypoint has been assigned an object and pose label according to its nearest match in the classifier (keypoint matching 106), the algorithm in the present invention must use the keypoint data to identify and segment individual objects from the scene. First, a histogram is constructed that sorts the keypoints according to their object labels (histogram of keypoints across classes 108). This initial step ensures that the most prominently represented object is processed first and eliminates the maximum number of keypoints in the early stages of processing, allowing the search for subsequent objects to proceed more smoothly.

Once the histogram is created (histogram of keypoints across classes 108), the algorithm enters into a loop that carries out the sequential extraction of object labels and boundaries (object boundary and label 110) until every keypoint has been accounted for or classified as noise. If there are enough keypoints 112, the keypoints corresponding to the tallest bin are sorted according to their training view. Thus, the keypoints are split among training views (split keypoints among training views 114). A clustering algorithm 116, such as Random Sample Consensus (RANSAC) as described by Fischler and Bolles (see Literature Reference No. 14) or the Generalized Hough Transform as described by Ballard (see Literature Reference No. 15), can be applied to find inlier keypoints 118 among the keypoints at each view. The inlier keypoints 118 represent stable configurations of keypoints that are consistent with an equivalent set within one of the training images in the training image set 100.

An affine transformation is computed 120 to generate the object boundaries and labels 110 using the least squares estimator between the inlier keypoints 118 and their corresponding points in the training image set 100. Determining the proper transform is a system identification problem in which there is an output (i.e., the inlier keypoints 118) and an input (i.e., training keypoints in the training image set 100 corresponding to the inlier keypoints), where the goal is to find the transformation matrix that connects the two. The affine transformation can then be applied 121 to the object boundary (i.e., outline) that is generated from the training data in the training image set 100 to "warp" it into the shape that matches the objects in the test image. In summary, the affine transformation is computed 120 based on the keypoint distribution (i.e., inlier keypoints 118) in the test image and is applied to the boundary mask, which provides the object boundary.

If the clustering algorithm 116 fails to find any inlier keypoints 118 among all of the keypoints for a given object class, then one must assume that the keypoints are the result of misclassifications and that the object does not exist. In this instance, the algorithm simply erases all of the keypoints of that object class and sets its histogram bin to have zero height. Typically, this scenario occurs in the waning iterations of the algorithm, where the major objects have been identified and the remaining keypoints that were misclassified or correspond to lighting artifacts must be accounted for.

However, when the classifier recovers strong inliers for an object, one must take care to remove only those keypoints in the vicinity of the object and its boundary (remove inliers and neighboring keypoints 124). One cannot simply erase all of the remaining keypoints that belong to the object, since this assumes only one instance of each object class and would miss multiple identical objects in the scene. Likewise, one cannot simply erase the inlier keypoints 118, since this constitutes an incomplete set that does not clear all of the keypoints that belong to the object; a single object may have many correctly-labeled keypoints, but only a handful of these may be inliers. Removing only the inlier keypoints 118 might produce false positive identification of the same object on subsequent iterations.

As described above, inlier keypoints (i.e., inliers) represent stable configurations of keypoints that are consistent with an equivalent set within one of the training images in the training image set. The term midliers refers to correctly labeled keypoints in the vicinity of the inliers. Outliers are keypoints that are not consistent within one of the training images in the training image set. To properly segment and label multiple objects to provide an object boundary and label 110 and to avoid false positive identifications and missing subsequent occurrences of the same object, one must take care to eliminate both the inliers and the correctly-labeled keypoints in the vicinity of the inliers (remove inliers and neighboring keypoints 124) referred to as midliers, because they are neither inliers nor outliers. The present invention carries this out by using the statistics of the inlier keypoints 118 to eliminate the object keypoints in their vicinity. This removes the midlier keypoints for the object without affecting the outliers or any keypoints that might belong to another occurrence of the object in the scene.

Upon completion, the algorithm returns to the histogram (histogram of keypoints across classes 108) and updates it with the removed keypoints. After updating the histogram, the process of clustering (clustering algorithm 116), segmentation, and keypoint removal (remove inliers and neighboring keypoints 124) can proceed again with the next-most dominant object label. This process continues until there are no longer enough unaccounted keypoints (enough keypoints 112) to carry out the clustering algorithm 116. Whether there are enough unaccounted keypoints depends entirely on the specific clustering algorithm 116 used to generate the inlier population. As non-limiting examples, RANSAC and the Hough transform employ different algorithms to match a template image to an observed imaged and, therefore, require different populations (both in quantity and location) of keypoints. At this point, the algorithm terminates (end 122) and the object labels and boundaries are returned (object boundary and label 110).

Figure 2:
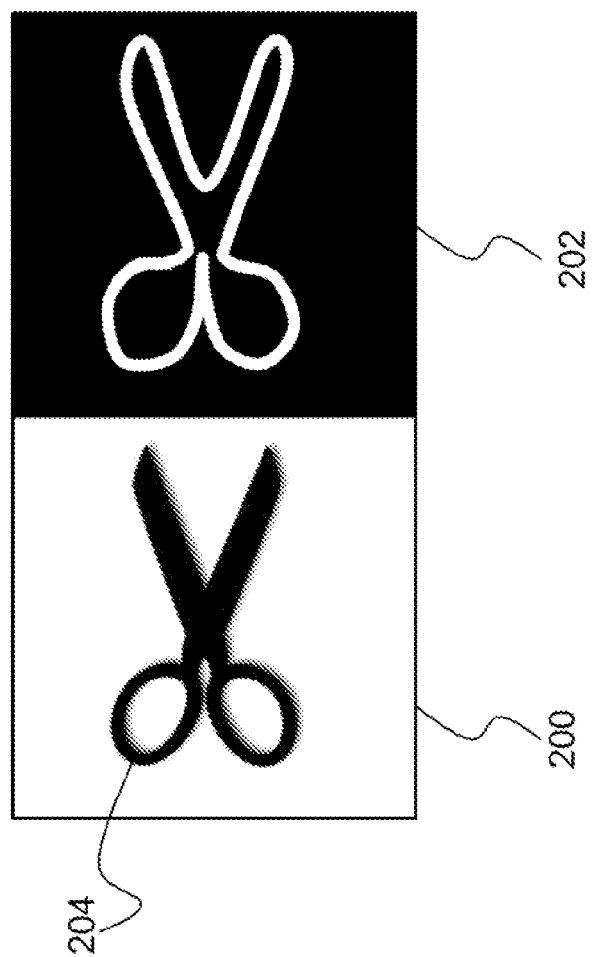
FIG. 2 illustrates an example of a training image and a boundary mask according to the present invention.

FIG. 2 illustrates an example training image 200 and a boundary mask 202 of an object 204 according to the present invention, which corresponds to the "training image set" depicted in FIG. 1 (FIG. 1, 100). The boundary masks for the training images are stored as part of the training set and are used to compute the boundary of the observed object once the affine transform matrix has been identified. The boundary mask 202 of the training image 200 permits the detailed segmentation of the object 204 once it has been identified. An affine transform (FIG. 1, 120) is computed based on the keypoint distribution in the test image and applied to the mask 202, which provides the object 204 boundary (FIG. 1, 110). The mask 202 can be automatically generated (from the training image) by an edge-detection program, or hand-drawn.

Figure 3:
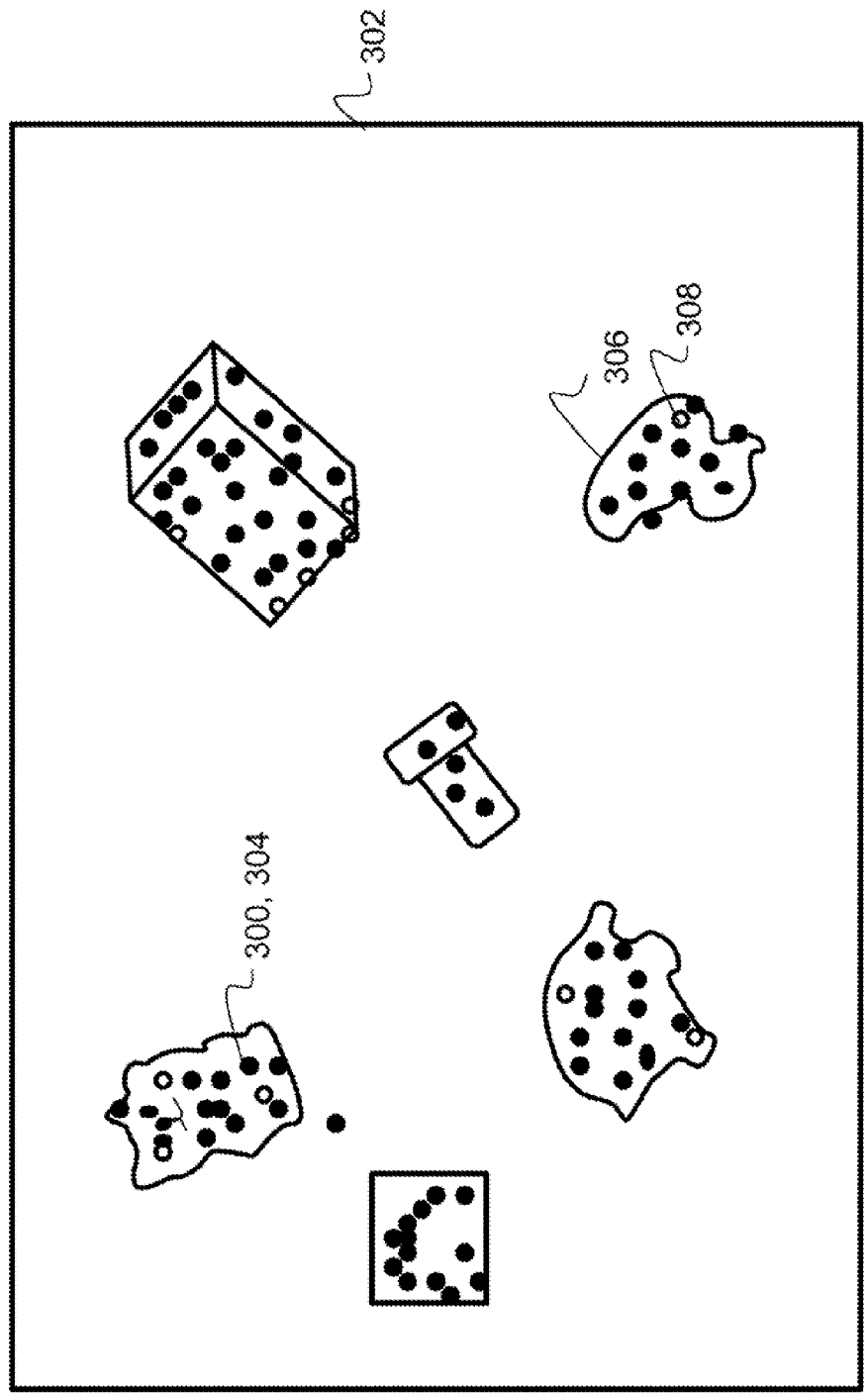
FIG. 3 illustrates keypoint extraction using LFA and labeling using a classifier algorithm according to the present invention.

FIG. 3 illustrates keypoint extraction (FIG. 1, 102) using LFA and labeling/matching (FIG. 1, 106) using a classifier algorithm. The keypoints 300 for an image 302 of a set of objects are illustrated as filled in circles 304. In practice, the circles are colored, and the color of each circle represents the object that it matches most closely. For example, the duck object 306 illustrated in FIG. 3 may be assigned the color red, such that keypoints classified correctly as "duck" will be red. Thus, any outliers for the duck object 306 are represented by another color, such as green (shown as an open circle 308 in FIG. 3). Although the bulk of keypoints 300 are classified correctly, there remain a few misclassifications that one must account for to ensure proper object segmentation. The clustering algorithm (FIG. 1, 116) separates these "outliers" from the correctly classified keypoints. FIG. 3 depicts these outliers as open circles 308.

Figure 4:
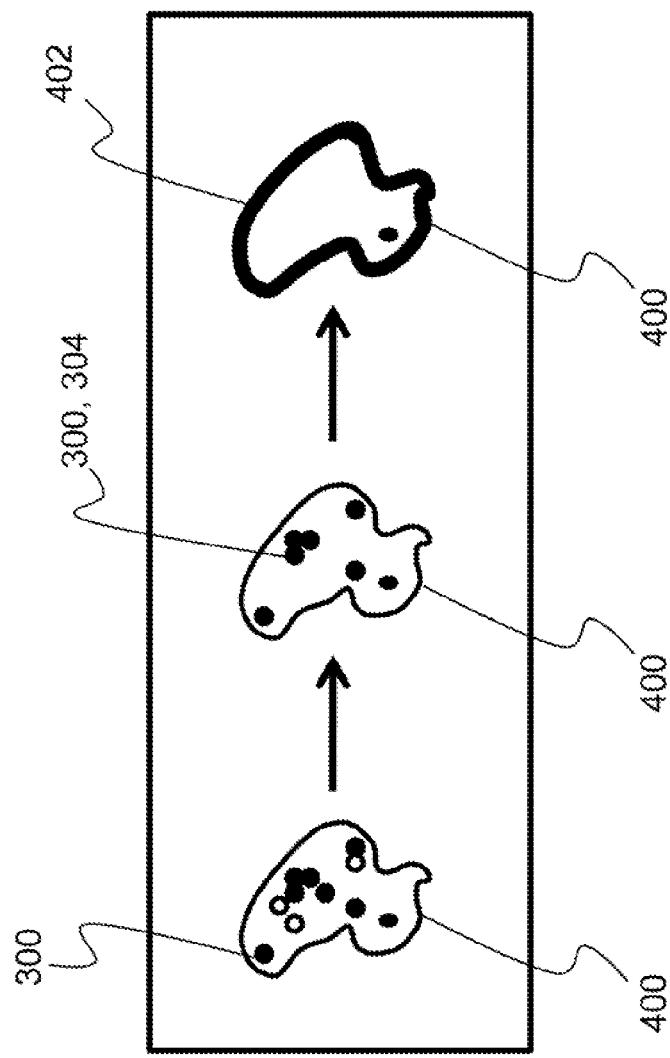
FIG. 4 illustrates the process of extracting an object boundary from keypoints according to the present invention.

FIG. 4 illustrates a process of extracting an object boundary from keypoints 300. The LFA and classifier algorithm generate (FIG. 1, 102) and label each keypoint 300 (FIG. 1, 106) on a given object 400 in a scene, as shown on the left. From the set of keypoints 300 corresponding to a single object view, the clustering algorithm (FIG. 1, 116) determines the inlier keypoints 300 (filled in circles 304) that strongly correspond to keypoints 300 in the training image at the same view, as shown in the center. These determined inlier keypoints 300, 304 (FIG. 1, 118) are used to compute an affine transform matrix (FIG. 1, 120), which is applied (FIG. 1, 121) to the training mask to provide the object boundary 402 (FIG. 1, 110), as shown on the right.

Figure 5:
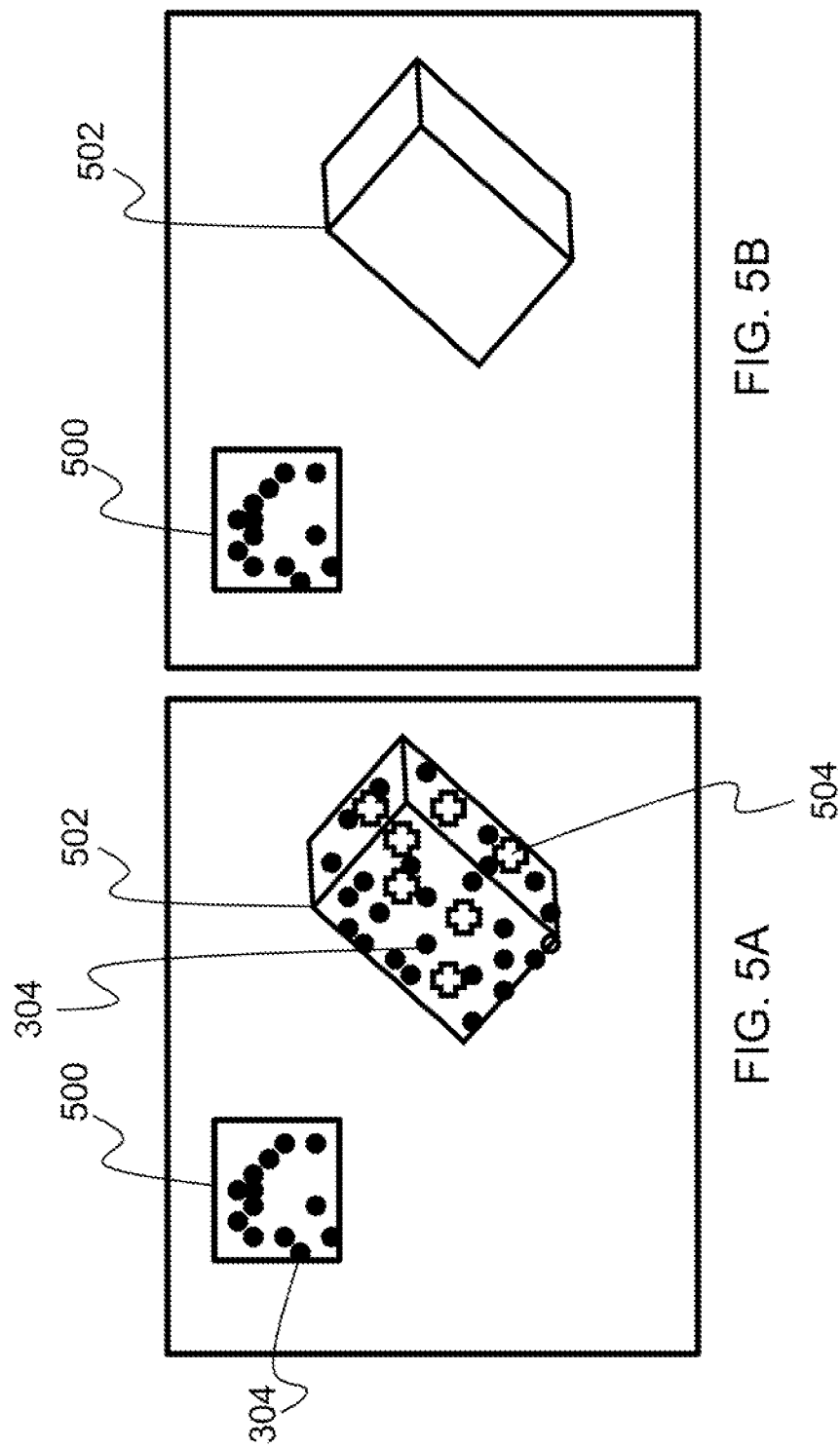
FIG. 5A illustrates keypoints on objects prior to keypoint removal.
FIG. 5B illustrates keypoint removal using inliers according to the present invention.

FIGS. 5A and 5B illustrate the clustering problem posed to the present invention, as depicted in FIG. 1 as "remove inliers and neighboring keypoints" (FIG. 1, 124). Here, there are two occurrences of the same object 500 and 502 (a box) at different angles, whose correctly-classified keypoints are indicated by filled in circles 304. The object boundary has been found for the object 502 in FIG. 5A based on a set of inliers 504, indicated by the "+" markers, and the boundary and pose of the object 502 have been computed. All other keypoints in the scene that correspond to the same object in the scene are indicated by filled in circles 304. The goal here is to remove the keypoints and midliers (the filled in circles 304 in the neighborhood of the inliers 504) without disturbing the keypoints in the second, not yet identified, occurrence of the object 500 in FIG. 5B. If all keypoints belonging to the object 500 were removed, the second occurrence of the same object 502 would be missed. If only the inliers 504 were removed, two instances of the first object 500 would be found. In one aspect of the present invention, the algorithm removes the inliers 504 and the keypoints around the inliers (the filled in circles 304), without affecting those keypoints from the second instance of the object.

The algorithm begins with the framework that each object in a scene can be represented by a Gaussian probability density function (pdf) that describes the likelihood that a given pixel falls within the actual boundary of a given object. Each of these pdf functions are centered at the centroid of the object and extend in the vertical and horizontal directions such that the distribution extends to cover the entire object. A given visual scene comprising a set of objects consists of a set of probability densities, each with its own specific signature that corresponds to the object that it belongs to. Initially, the mean and covariance of these densities is unknown; thus, the problem of object localization becomes an inference problem, in which one must estimate the mean and covariance of each density to localize the object as shown in FIGS. 6A-6C.

Figure 6:
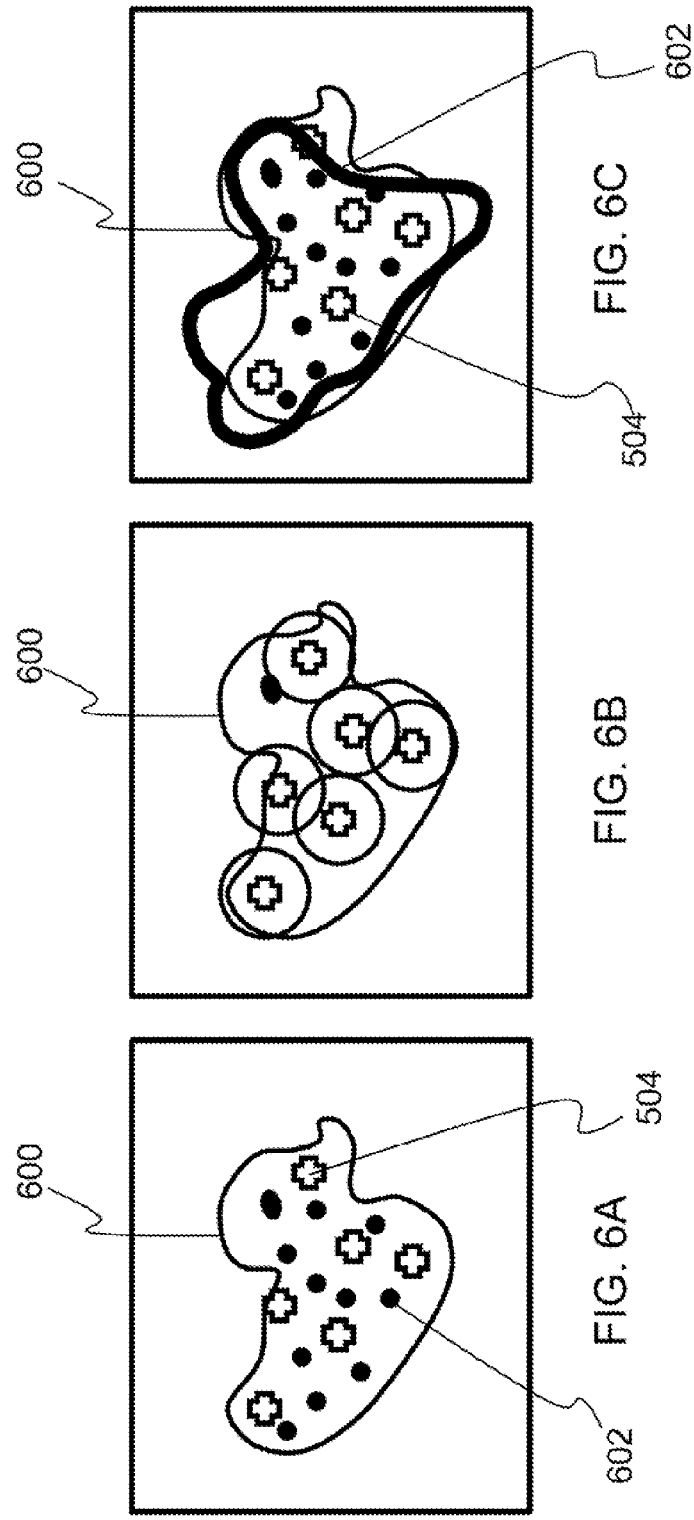
FIG. 6A illustrates inlier keypoints and neighboring midlier keypoints on an object prior to midlier keypoint removal according to the present invention.
FIG. 6B illustrates kernel construction for inlier keypoints according to the present invention.
FIG. 6C illustrates a density estimate based on the sum of kernels that mimics the outline of an object according to the present invention.

FIGS. 6A-6C illustrate the process of object localization using keypoints according to the present invention, depicted as "inlier keypoints" in FIG. 1 (FIG. 1, 118). As shown in FIG. 6A, after inliers 504 (shown as crosses) are computed for the most dominant object 600, one must remove only the inliers 504 and the neighboring midlier 602 keypoints (closed circles). This portion of the process is depicted in the step of removing inliers and neighboring keypoints 124, as described above. The midliers 602 likely belong to different training poses of the same object. Failure to remove all of the midlier 602 points may result in false positive detections on subsequent iterations of the recognition algorithm. As shown in FIG. 6B, for each inlier 504 keypoint, a kernel is constructed based on the overall shape of the data. The shaping of the kernel is determined based on the equations described below, which incorporate the mean and covariance of the inlier keypoints (i.e., the "shape" of the distribution). The sum of these kernels constructs a density estimate that roughly mimics the outline of the object. As shown in FIG. 6C, because each pixel is given a numeric probability value, the inlier 504 and midlier 602 keypoints can be easily removed by computing their probabilities and removing all that fall above a given threshold. In this case, the probability threshold envelops all of the keypoints that should be removed. Note that this range is larger and more complete than if the envelopes of the individual keypoint kernels had been used, as in a simple distance-based approach.

In this instance, one can imagine the keypoints of the object, which will tend to congregate around the object centroid and only occasionally fall outside of the object boundary, as random samples from this probability distribution. In this instance, it is possible to reconstruct a pdf from a set of samples using a method called Kernel Density Estimation (KDE), as described by Silverman (see Literature Reference No. 16), which represents each keypoint as a small Gaussian distribution and the pdf estimate as the average probability over the set of Gaussians provided by the keypoints. According to KDE, an estimate of a bivariate pdf, f, from a set of n random samples, X, is defined as:

$$f(x) = \frac{\det(S)^{-1/2}}{2\pi h^2} \sum_{i=1}^{n} \exp\left\{\frac{-1}{2h^2}(x - X_i)^T S^{-1}(x - X_i)\right\},$$

where x is a two-dimensional vector that corresponds to the (x,y)-coordinate of the specific pixel value at a given keypoint, and X is a matrix containing the (x,y)-coordinates of n inliers. The value of S corresponds to the covariance of the inlier positions, and gives the pdf a shape that correlates to the distribution of the inliers. This follows the density pre-whitening method of Fukunaga (see Literature Reference No. 17), which linearly transforms the data to have unit covariance prior to estimating the density, smoothing it using a radially symmetric kernel, and then transforming it back. This eliminates the need for multiple "smoothing parameters" (h) for each cardinal direction; this single smoothing parameter is derived to provide the optimal degree of smoothness for the pdf estimate and is defined as:

$$h = n^{-1/6}$$

for the bivariate case. Therefore, as long as the inlier keypoints are spread across the entire object, the pdf estimate provided by KDE will be appropriately shaped such that it covers all of the keypoints on the object. This portion of the process is depicted in FIG. 1 as "inlier keypoints" (FIG. 1, 118).

The midlier keypoints are removed from the identified object (FIG. 1, 124) using the density estimate determined from the inliers (FIG. 1, 118). The algorithm cycles through each of the keypoints in the image that corresponds to the newly identified object and computes the probability that the keypoint belongs to the newly identified object (i.e., is near the population of inliers). If the probability that the keypoint falls within the detected object rises above a predetermined threshold, then it is erased along with the inliers. In this way, the algorithm ensures that only the keypoints in the neighborhood of the inliers are removed; this leaves keypoints from other instances of the same object untouched so that they can be detected in subsequent iterations of the clustering algorithm.

Upon completion of this stage, the algorithm returns to the histogram (FIG. 1, 108) and updates it with the removed keypoints. Since one can easily count the number of keypoints removed from the image, there is little need to compute the histogram again. After updating the histogram, the process of clustering (FIG. 1, 116), segmentation (FIGS. 1, 120 and 121), and keypoint removal (FIG. 1, 124) can proceed again with the next-most dominant object label. This process continues until there are no longer enough unaccounted keypoints to carry out the clustering algorithm. At this point, the algorithm terminates and the object labels and boundaries are returned.

The present invention was applied to a number of different natural and artificial scenes containing varying numbers of objects. For each trial, the training database was loaded with more than ten objects at different views and testing images containing between three to six objects were analyzed using the algorithm outlined in the previous section. In each instance, the algorithm was able to label and segment over 92% of the objects in the scene, including instances where multiple instances of the same object occurred in the scene and where the objects were partially occluded by other objects.

The first set of multiple-object images used to test the present invention was constructed from the Columbia COIL-100 dataset (see Literature Reference No. 18). This dataset consists of 100 objects, with 72 views of each that correspond to five-degree rotations in the Z-plane. The system was trained on ten objects from this dataset for four views of each (ninety degree increments). The test objects in this case were artificially created by superimposing rotated and scaled versions of the remaining 68 views of the objects onto a featureless black background. The testing images for this trial contain between three and six objects. The result of one of these trials is presented in FIG. 7. Although the scene contains two instances of a box 702 and 704, the algorithm easily finds both objects and provides a close boundary, as described below.

Figure 7:
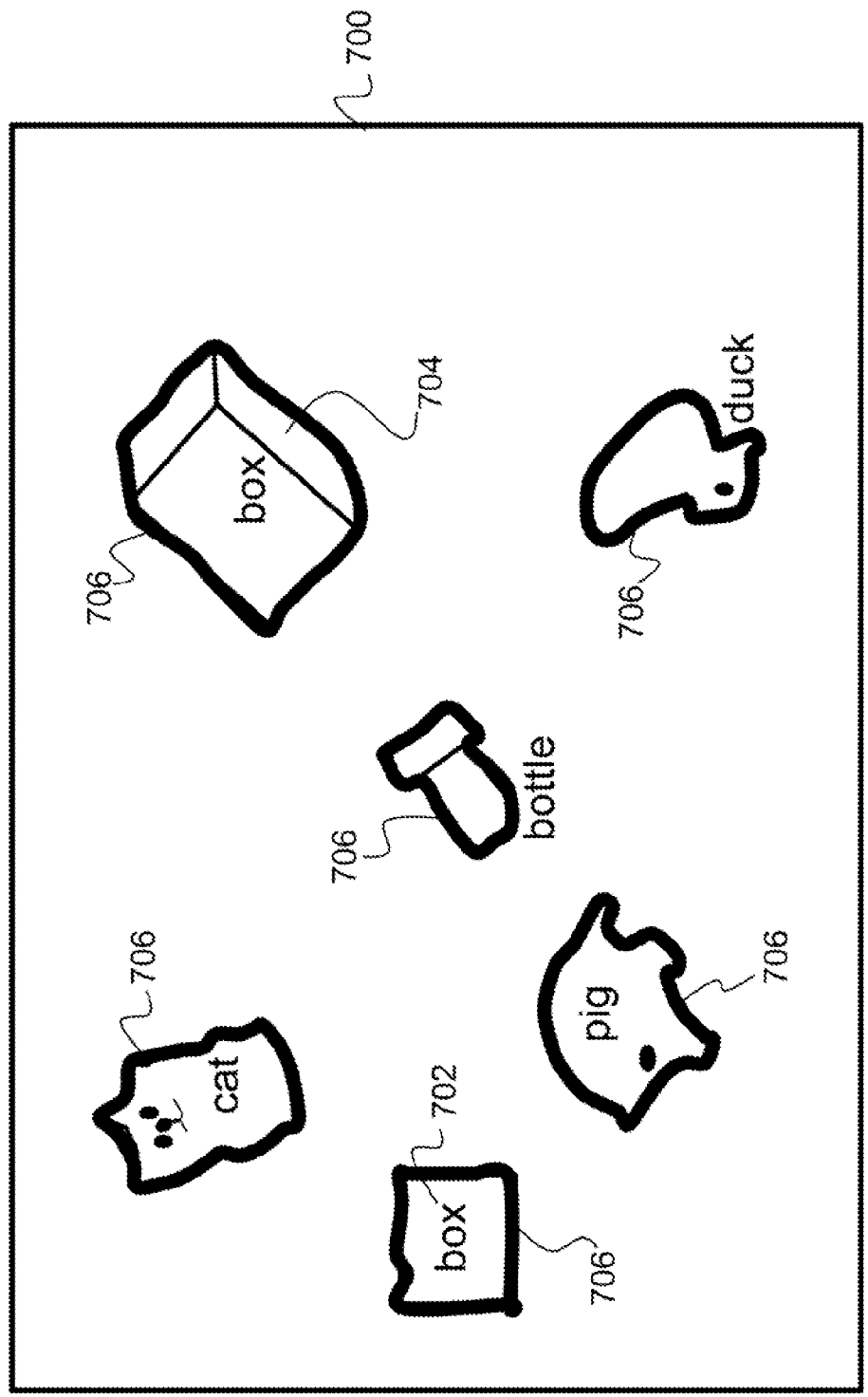
FIG. 7 illustrates a scene with multiple instances of one object according to the present invention.

FIG. 7 is a COIL-100 scene 700 with multiple instances of one type of object 702 and 704 (in this example, a box). All six objects in the scene are identified, labeled, and segmented. In this instance, two different views of the box appear. Due to the algorithm presented herein, the present invention is able to find both instances of the object 702 and 704. The excellent boundaries 706 indicate that the algorithm has correctly obtained the pose information for each object in the scene 700.

The final dataset employed by the demonstration of the present invention was generated from objects found around a laboratory. The training data was collected by placing each of 15 objects on a turntable and photographing every 90 degrees. The testing images were collected by randomly placing objects on the table at various orientations and photographing. Often, multiple copies of the same object were included in the scene to validate the novelty of the present invention.

Figure 8:
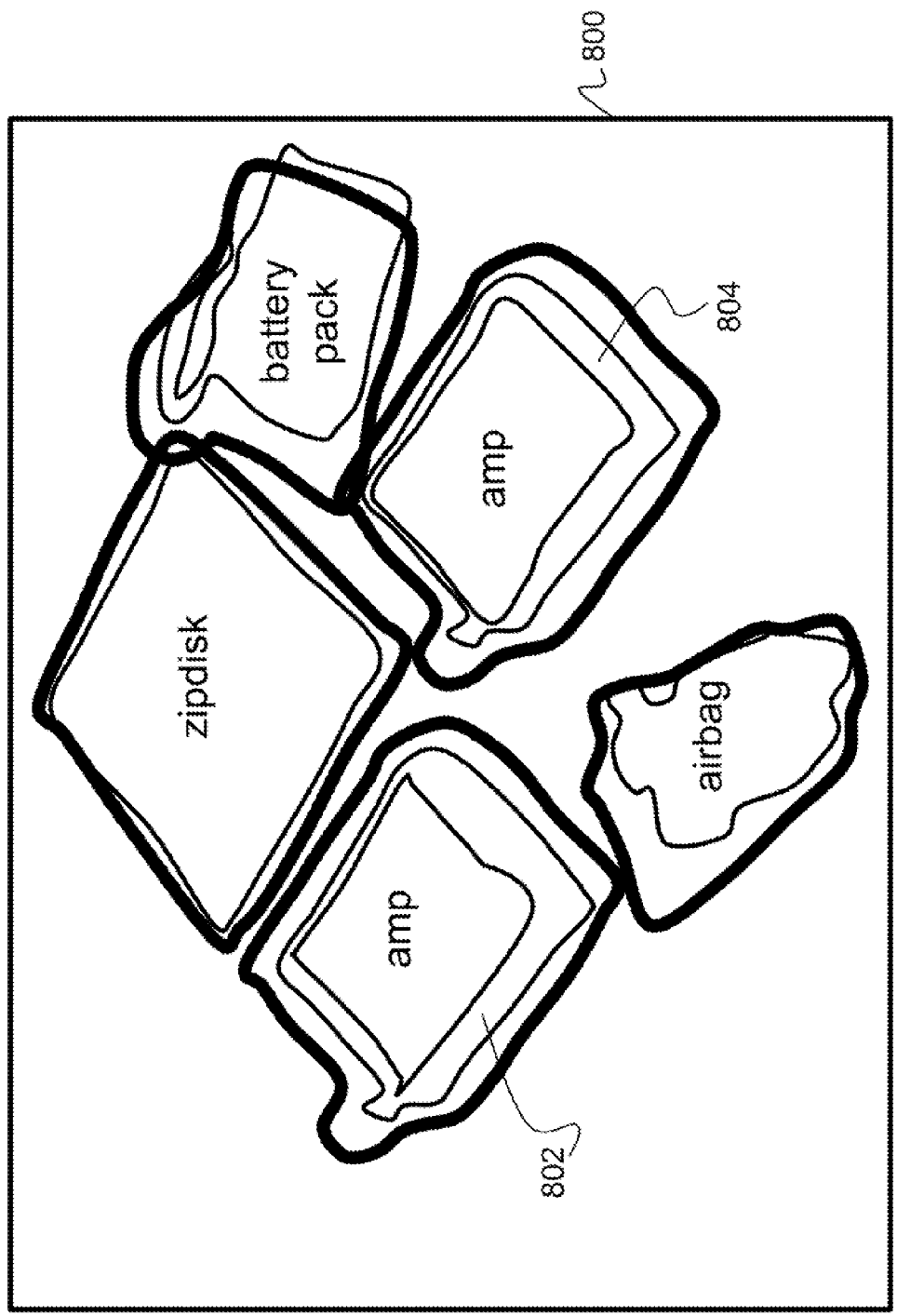
FIG. 8 illustrates a scene from a dataset with two identical objects according to the present invention.
Figure 9:
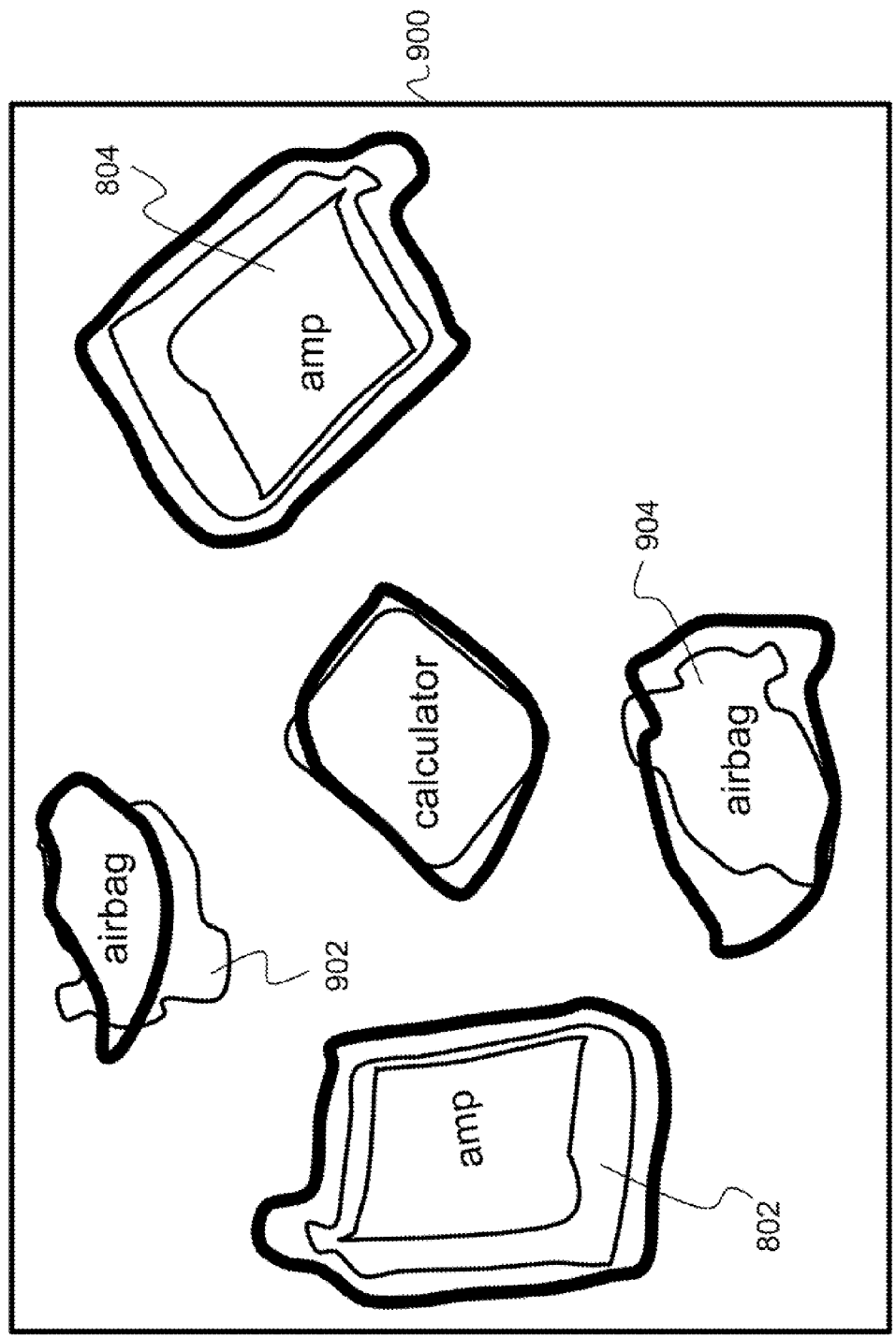
FIG. 9 illustrates a scene from a dataset with two pairs of identical objects according to the present invention.

In the scenarios presented in FIGS. 8 and 9, one can see that the objects were correctly identified and segmented using the training mask and affine transform provided by the clustering algorithm. Because of the effectiveness of the algorithm, the computer was able to recognize and segment scenes that contained multiple copies of the same object without yielding any false or double positive responses. In addition, in instances where occlusion occurred, the algorithm managed to capture the boundary of the object. The present invention effectively adds a great deal of functionality to the procedure without compromising the advances found in the prior art. This proves the utility and function of the system described herein.

FIG. 8 illustrates a scene 800 from another dataset having two identical objects. All five objects in the scene were found and segmented. In this instance, the objects labeled "amp" 802 and 804 are very near one another and their keypoint populations nearly overlap, which would limit the use of a clustering algorithm to separate these objects. However, the algorithm in the present invention finds both objects 802 and 804 in very little time. FIG. 9 illustrates a scene from another dataset with two pairs of identical objects. In this instance, the scene 900 contains two pairs of identical objects labeled "amp" 802 and 804 and "airbag" 902 and 904 in different poses. The algorithm described in the present invention is able to find both pairs of objects.

Figure 10:
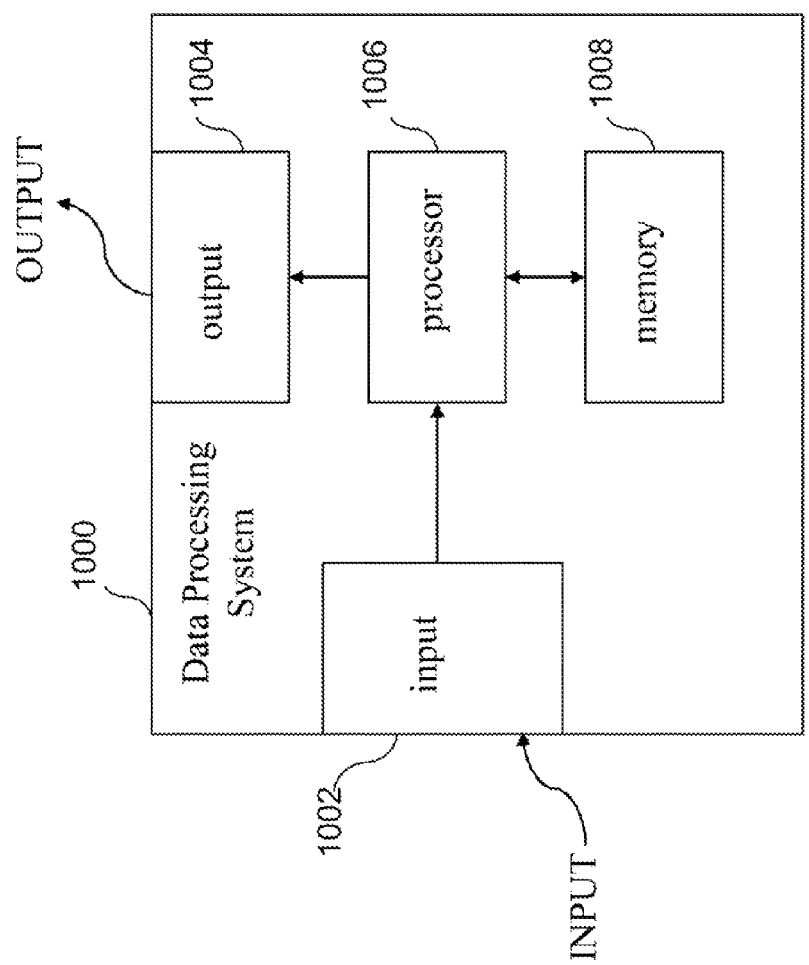
FIG. 10 is an illustration of a data processing system according to the present invention.

FIG. 10 illustrates a block diagram depicting components of a data processing system 1000 (e.g., computer) incorporating the operations of the method described above. The method utilizes a data processing system 1000 for storing computer executable instructions (or instruction means) for causing a processor to carry out the operations of the above described method. The data processing system 1000 comprises an input 1002 for receiving information from a user. Information received may include input from devices such as cameras, scanners, keypads, keyboards, microphone, other peripherals such as storage devices, other programs, etc. The input 1002 may include multiple "ports." An output 1004 is connected with a processor 1006 (or processors) for providing information for transmission to other data processing systems, to storage devices, to display devices such as monitors, to generating information necessary for delivery, and to other mechanisms for presentation in user-usable forms. The input 1002 and the output 1004 are both coupled with the processor 1006, which may be a general-purpose computer processor or a specialized processor designed specifically for use with the present invention. The processor 1006 is coupled with a memory 1008 to permit storage of data and software to be manipulated by commands to the processor 1006.

Figure 11:
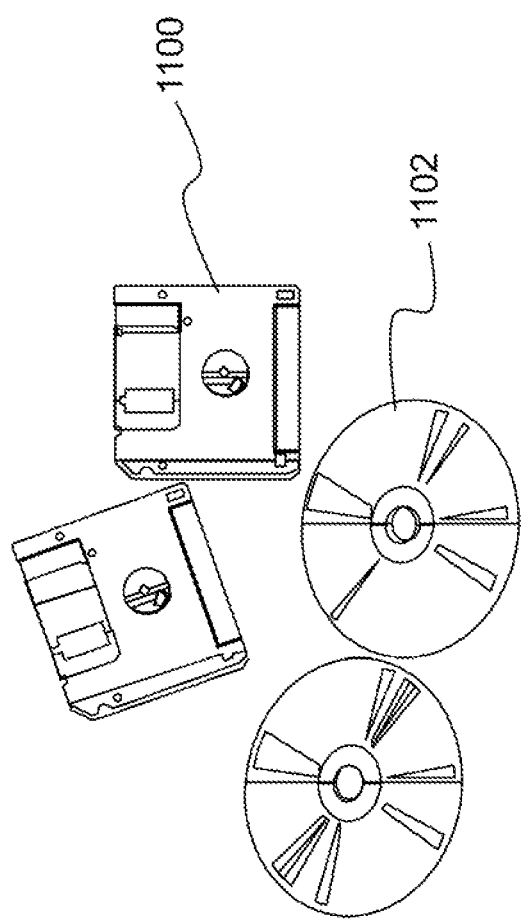
FIG. 11 is an illustration of a computer program product according to the present invention.

An illustrative diagram of a computer program product embodying the present invention is depicted in FIG. 11. As a non-limiting example, the computer program product is depicted as either a floppy disk 1100 or an optical disk 1102. However, as mentioned previously, the computer program product generally represents computer readable code (i.e., instruction means or instructions) stored on any compatible computer readable medium.

What is claimed is:
1. A system for multiple-object recognition in visual images, the system comprising:
one or more processors configured to perform operations of:
receiving an input test image comprising at least one object;

extracting a plurality of keypoints representing the at least one object from the input test image using a local feature algorithm;

matching the plurality of keypoints from the input test image with a plurality of keypoints representing an object from at least one training image having a boundary mask stored in a training database, resulting in a set of matching keypoints;

applying a clustering algorithm to the set of matching keypoints to detect a plurality of inliers among the set of matching keypoints, wherein the plurality of inliers belong to a first object class representing the object;

following application of the clustering algorithm, classifying a keypoint in the set of matching keypoints as a midlier if it is in a neighboring vicinity of an inlier and belongs to the first object class, wherein a plurality of midliers is classified;

removing the plurality of inliers from the input test image;

removing the plurality of midliers from the input test image;

generating an object label and an object boundary for the at least one object; and identifying and segmenting the at least one object in the input test image.

2. The system for multiple-object recognition in visual images as set forth in claim 1, wherein the system is further configured to perform an operation of classifying each of the plurality of keypoints from the input test image with an object label and a pose according to a nearest match in the training database using a classifier algorithm.

3. The system for multiple-object recognition in visual images as set forth in claim 2, wherein the system is further configured to perform an operation of constructing a histogram to sort the set of matching keypoints according to their object labels.

4. The system for multiple-object recognition in visual images as set forth in claim 3, wherein the system is further configured to perform operations of:

computing an affine transform matrix using a least squares estimator between the inliers and a set of corresponding keypoints in the at least one training image; and applying the affine transform matrix to the boundary mask of the at least one training image to provide the object boundary.

5. The system for multiple-object recognition in visual images as set forth in claim 4, wherein the system is further configured to perform operations of:

representing the at least one object in the input test image with a probability density function that describes the likelihood that a pixel in the input test image falls within an actual boundary of the at least one object;

constructing a probability density function using kernel density estimation to determine a density estimate for each inlier; and removing the plurality of midliers from the at least one object in the input test image using a density estimate determined from the plurality of inliers.

6. The system for multiple-object recognition in visual images as set forth in claim 5, wherein the system is further configured to perform operations of:

computing a probability that a keypoint belongs to the at least one identified object in the input test image; and removing a keypoint if the probability that the keypoint falls within the at least one identified object is above a predetermined threshold.

7. A computer-implemented method for multiple-object recognition in visual images, comprising an act of:

causing a data processor to perform operations of:

receiving an input test image comprising at least one object;

extracting a plurality of keypoints representing the at least one object from the input test image using a local feature algorithm;

matching the plurality of keypoints from the input test image with a plurality of keypoints representing an object from at least one training image having a boundary mask stored in a training database, resulting in a set of matching keypoints;

applying a clustering algorithm to the set of matching keypoints to detect a plurality of inliers among the set of matching keypoints, wherein the plurality of inliers belong to a first object class representing the object;

following application of the clustering algorithm, classifying a keypoint in the set of matching keypoints as a midlier if it is in a neighboring vicinity of an inlier and belongs to the first object class, wherein a plurality of midliers is classified;

removing the plurality of inliers from the input test image;

removing the plurality of midliers from the input test image;

generating an object label and an object boundary for the at least one object; and identifying and segmenting the at least one object in the input test image.

8. The method for multiple-object recognition in visual images as set forth in claim 7, further comprising an act of classifying each of the plurality of keypoints from the input test image with an object label and a pose according to a nearest match in the training database using a classifier algorithm.

9. The method for multiple-object recognition in visual images as set forth in claim 8, further comprising an act of constructing a histogram to sort the set of matching keypoints according to their object labels.

10. The method for multiple-object recognition in visual images as set forth in claim 9, further comprising acts of:

computing an affine transform matrix using a least squares estimator between the inliers and a set of corresponding keypoints in the at least one training image; and applying the affine transform matrix to the boundary mask of the at least one training image to provide the object boundary.

11. The method for multiple-object recognition in visual images as set forth in claim 10, further comprising acts of:

representing the at least one object in the input test image with a probability density function that describes the likelihood that a pixel in the input test image falls within an actual boundary of the at least one object;

constructing a probability density function using kernel density estimation to determine a density estimate for each inlier; and removing the plurality midliers from the at least one object in the input test image using a density estimate determined from the plurality of inliers.

12. The method for multiple-object recognition in visual images as set forth in claim 11, further comprising acts of:

computing a probability that a keypoint belongs to the at least one identified object in the input test image; and removing a keypoint if the probability that the keypoint falls within the at least one identified object is above a predetermined threshold.

13. A computer program product for multiple-object recognition in visual images, the computer program product comprising:
computer-readable instruction means stored on a non-transitory computer-readable medium that are executable by a computer having a processor for causing the processor to perform operations of:
receiving an input test image comprising at least one object;
extracting a plurality of keypoints representing the at least one object from the input test image using a local feature algorithm;
matching the plurality of keypoints from the input test image with a plurality of keypoints representing an object from at least one training image having a boundary mask stored in a training database, resulting in a set of matching keypoints;
applying a clustering algorithm to the set of matching keypoints to detect a plurality of inliers among the set of matching keypoints, wherein the plurality of inliers belong to a first object class representing the object;
following application of the clustering algorithm, classifying a keypoint in the set of matching keypoints as a midlier if it is in a neighboring vicinity of an inlier and belongs to the first object class, wherein a plurality of midliers is classified;
removing the plurality of inliers from the input test image;
removing the plurality of midliers from the input test image;
generating an object label and an object boundary for the at least one object; and
identifying and segmenting the at least one object in the input test image.

14. The computer program product for multiple-object recognition in visual images as set forth in claim 13, further comprising instruction means for causing the processor to perform an operation of classifying each of the plurality of keypoints from the input test image with an object label and a pose according to a nearest match in the training database using a classifier algorithm.

15. The computer program product for multiple-object recognition in visual images as set forth in claim 14, further comprising instruction means for causing the processor to perform an operation of constructing a histogram to sort the set of matching keypoints according to their object labels.

16. The computer program product for multiple-object recognition in visual images as set forth in claim 15, further comprising instruction means for causing the processor to perform operations of:
computing an affine transform matrix using a least squares estimator between the inliers and a set of corresponding keypoints in the at least one training image; and
applying the affine transform matrix to the boundary mask of the at least one training image to provide the object boundary.

17. The computer program product for multiple-object recognition in visual images as set forth in claim 16, further comprising instruction means for causing the processor to perform operations of:
representing the at least one object in the input test image with a probability density function that describes the likelihood that a pixel in the input test image falls within an actual boundary of the at least one object;
constructing a probability density function using kernel density estimation to determine a density estimate for each inlier; and
removing the plurality of midliers from the at least one object in the input test image using a density estimate determined from the plurality of inliers.

18. The computer program product for multiple-object recognition as set forth in claim 17, further comprising instructions means for causing the processor to perform operations of:
computing a probability that a keypoint belongs to the at least one identified object in the input test image; and
removing a keypoint if the probability that the keypoint falls within the at least one identified object is above a predetermined threshold.

* * * * *